March 10, 1959  W. H. FORD  2,876,539
KNIFE GUARD
Filed July 23, 1954  2 Sheets-Sheet 1

INVENTOR.
William H. Ford
BY
Thos. F. Donnelly
Attorney

March 10, 1959   W. H. FORD   2,876,539
KNIFE GUARD

Filed July 23, 1954   2 Sheets-Sheet 2

INVENTOR.
William H. Ford
BY
Attorney

United States Patent Office 2,876,539
Patented Mar. 10, 1959

2,876,539
KNIFE GUARD

William H. Ford, Detroit, Mich.

Application July 23, 1954, Serial No. 445,407

1 Claim. (Cl. 30—283)

My invention relates to a new and useful improvement in a knife guard whereby there is extended along the cutting edge of the knife a non-cutting element which may be moved laterally to various positions of spaced offset relation to the plane of the knife so that the guard will serve as a gauge for determining the thickness of slices of material which are sliced with the knife.

It is an object of the present invention to provide a guard of this type which will be simple in construction, economical in manufacture, durable, highly efficient in use, and easily and quickly adjusted to various positions.

Another object of the invention is the provision of a knife guard of this class which may be easily and quickly locked in its various positions of adjustment, and retained in such position.

Another object of the invention is the provision of a knife guard which may be rocked on axes parallel to the longitudinal axis of the knife so that the blade guard may be positioned on one side of the blade or the other, thus making it possible to adjust the slice gauge member for use by either a left-handed person or a right-handed person.

Another object of the invention is the provision of a blade guard of this type having a screw member which may be loosened or tightened when it is desired to make an adjustment of the position of the guard.

Another object of the invention is the provision of a blade guard of this type which may be easily and quickly attached to a knife blade without requiring the mutilation of the blade itself.

Other objects will appear hereinafter.

It is recognized that various modifications and changes could be made in the detail of structure illustrated without departing from the invention, and it is intended that the present disclosure shall be considered but the preferred embodiment.

Forming a part of this application are drawings in which.

Figure 1:
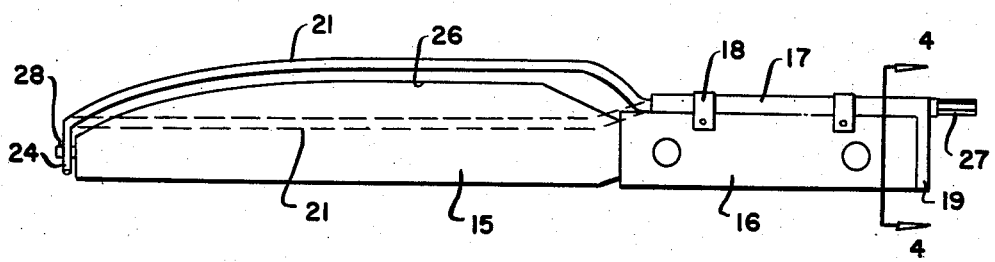
Fig. 1 is a side elevational view of the invention showing the invention applied.
Figure 2:
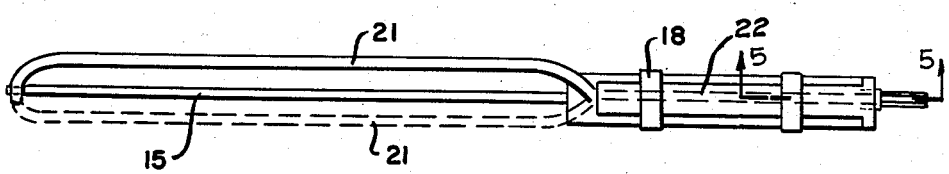
Fig. 2 is a plan view of the invention shown in Fig. 1 taken at right angles to the position of Fig. 1.
Figure 3:
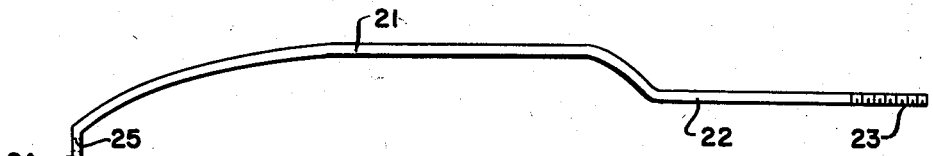
Fig. 3 is an elevational view of the guard member used in the invention.
Figure 4:
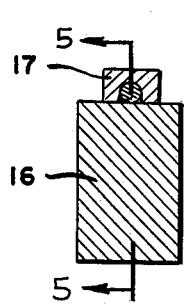
Fig. 4 is a slightly enlarged sectional view taken on line 4—4 of Fig. 1.
Figure 5:
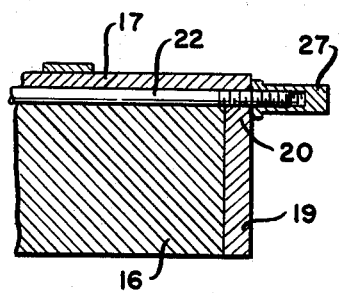
Fig. 5 is a fragmentary enlarged sectional view taken on line 5—5 of Fig. 2.

In Figure 1, I have illustrated a knife embodying a blade 15 and a handle 16 extending lengthwise of the knife itself and secured thereto by clips 18 in a channel bearing member 17 having an angularly turned end portion 19 engaging the end of the handle 16 and provided with a threaded opening 20 formed therethrough.

The guard is preferably in the form of a wire 21 having an offset portion 22 with the terminal threaded portion 23 at one end and provided at its opposite end with an angularly turned portion 24 in which is formed an opening 25. Projecting outwardly from the end of the blade 15 is a trunnion 28 projected through the opening 25 so that the guard 21 may rock on the trunnion as an axis and also rock on the portion 22 as an axis.

This guard portion 21 overlies the blade 15 from end to end and upon loosening the nut 27 threaded on the terminal portion 23 the guard 21 may be rocked to either side of the blade to various positions. The threaded terminal portion 23 is threaded through the opening 20 so that the nut 27 actually serves as a lock-nut. After the guard portion 21 has been adjusted to its desired position, the nut 27 may be screwed tightly against the member 19 so that the guard member 21 is thus locked in its position of adjustment.

Figure 6:
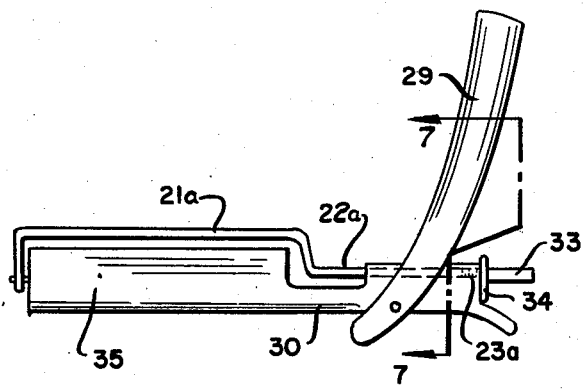
Fig. 6 is a fragmentary elevational view showing the invention applied to a razor.
Figure 7:
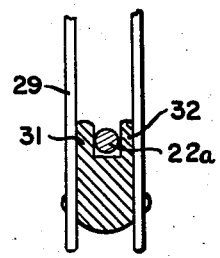
Fig. 7 is a sectional view taken on line 7—7 of Fig. 6.

In Figure 6, I have illustrated the invention used with a razor embodying a handle 29 and a blade shank 30. Formed on this blade shank are the walls 31 and 32 which form a channel in which extends an offset portion 22a of the guard member 21a. A threaded terminal portion 23a is formed on the portion 22a and threaded on to this is a nut 33 which bears against an abutment 34. The guard member 21a may, upon loosening of the nut 33, be rocked to either side of the blade 35 and then secured in position by tightening of the nut 33.

Figure 8:
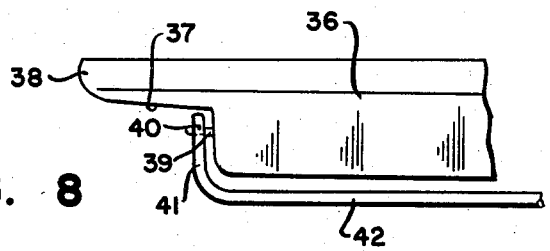
Fig. 8 is a fragmentary elevational view showing the invention applied to a paring knife.

In Figure 8, I have shown a paring knife embodying a blade 36 cut away as at 37 to provide the forwardly projecting reduced portion 38. A trunnion 39 extends from the cut away portion for projection through an opening 40 formed in the angularly turned portion 41 of the guard 42. This forwardly projecting reduced portion 38 serves as a means for cleaning out potato eyes and similar cavities which may be found in vegetables. The cutter blade itself is otherwise constructed and operated as shown in Figure 1.

Figure 9:
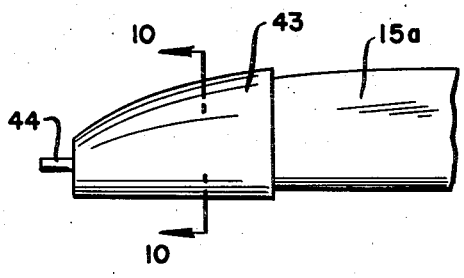
Fig. 9 is a fragmentary elevational view showing an attaching clip mounted on a knife blade.
Figure 10:
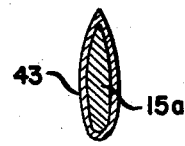
Fig. 10 is a sectional view taken on line 10—10 of Fig. 9.

In Figure 9, I have shown a knife blade 15a having a clip 43 fitted over the end of the blade 15a and provided with an outwardly extending trunnion 44. In the event it is not desired to form a trunnion such as the trunnion 28 on the knife blade, this adaptor 43 may be fitted over the end of any type of blade.

Experience has shown that with a knife guard of this type, the guard may be easily and quickly adjusted to various positions to lie on either side of the plane of the knife blade, and that the thicknesses of slices to be made with the knife may be determined and the structure adjusted and securely held in such adjusted position.

What I claim is:

In a device of the class described, the combination of, a knife blade handle; a knife blade provided with a cutting edge along the lower edge thereof and a blunt edge along the upper edge thereof and having the rear end thereof fastened in the handle; a guard member disposed along the cutting edge of the blade and extending the length of the blade; an angularly turned portion on the front end of said guard member and having an opening formed therethrough; a longitudinally extended trunnion mounted on the front end of said blade and being rockably engageable in said opening in the angularly turned portion; an offset portion on the rear end of said guard member extending rearwardly along the upper edge of the handle and over the length of the handle and having the terminal end thereof extending beyond the rear edge of said handle; the terminal end of said offset portion being threaded; a longitudinally extended retainer means on the upper edge of said handle; said offset portion being rockably mounted in said retainer means with the threaded terminal end threadably engaged with a part of the retainer means; a nut threaded upon said terminal portion and engageable with the rear end of said retainer means for locking said guard member against rocking movement, and, said guard member when not locked by said nut being rockable on said trunnion and on said offset portion as an axis to various positions on opposite sides of said blade.

References Cited in the file of this patent

UNITED STATES PATENTS

| | | |
|---|---|---|
| 1,296,805 | Holownia | Mar. 11, 1919 |
| 2,028,915 | Ott | Jan. 28, 1936 |
| 2,301,737 | Miller | Nov. 10, 1942 |